(12) United States Patent
Horning et al.

(10) Patent No.: US 11,458,605 B2
(45) Date of Patent: Oct. 4, 2022

(54) PACKING INSERTION TOOL FOR PAINT AND OTHER FLUID PUMPS

(71) Applicant: Graco Minnesota Inc., Minneapolis, MN (US)

(72) Inventors: Jeromy D. Horning, Albertville, MN (US); William M. Blenkush, Becker, MN (US); August F. Legatt, Maple Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 560 days.

(21) Appl. No.: 16/352,549

(22) Filed: Mar. 13, 2019

(65) Prior Publication Data

US 2019/0299378 A1  Oct. 3, 2019

Related U.S. Application Data

(60) Provisional application No. 62/648,996, filed on Mar. 28, 2018.

(51) Int. Cl.
  *B25B 27/00* (2006.01)
  *B25B 27/02* (2006.01)
  (Continued)

(52) U.S. Cl.
  CPC .......... *B25B 27/0028* (2013.01); *B25B 27/02* (2013.01); *B25B 27/24* (2013.01);
  (Continued)

(58) Field of Classification Search
  CPC ..... B25B 27/0028; B25B 27/02; B25B 27/24; F04B 15/02; F04B 53/143; F04B 53/164; F16J 15/3252
  See application file for complete search history.

(56) References Cited

U.S. PATENT DOCUMENTS

| 1,956,843 A | 5/1934 | Wheeler |
| 2,037,046 A | 4/1936 | Robertson |

(Continued)

FOREIGN PATENT DOCUMENTS

| CN | 1224118 A | 7/1999 |
| CN | 102124353 A | 7/2011 |

(Continued)

OTHER PUBLICATIONS

Second Chinese Office Action for CN Application No. 2019102386358, dated Mar. 2, 2021, pp. 11.

(Continued)

*Primary Examiner* — Seahee Hong
(74) *Attorney, Agent, or Firm* — Kinney & Lange, P.A.

(57) ABSTRACT

A packing insertion tool for inserting a packing stack into a cylinder of a piston pump includes a packing holder on which the packing stack is mounted. The packing holder includes a body, a handle disposed at a first end of the body, and a plurality of fingers disposed at a second end of the body. The fingers extend axially from the body and the packing stack is mounted on the fingers, between the body and a retaining feature disposed at a distal end of the fingers. The fingers can flex to allow the diameter of the distal end of the fingers to change as the packing stack slides on to and off of the fingers.

17 Claims, 8 Drawing Sheets

(51) Int. Cl.
  *B25B 27/24* (2006.01)
  *F16K 41/02* (2006.01)
  *F04B 53/16* (2006.01)
  *F04B 53/14* (2006.01)
  *F04B 15/02* (2006.01)

(52) U.S. Cl.
  CPC ............ *F04B 15/02* (2013.01); *F04B 53/143* (2013.01); *F04B 53/164* (2013.01); *F16K 41/02* (2013.01)

(56) References Cited

U.S. PATENT DOCUMENTS

| | | |
|---|---|---|
| 2,860,535 A | 11/1958 | Fowler |
| 3,030,702 A | 4/1962 | Fowler |
| 3,069,178 A | 12/1962 | Rosen |
| 3,168,774 A | 2/1965 | Volkening |
| 3,266,347 A | 8/1966 | Robertson |
| 3,357,283 A | 12/1967 | Geyer et al. |
| 3,588,126 A | 6/1971 | McKillop et al. |
| 3,639,972 A | 2/1972 | Schelin et al. |
| 3,861,020 A | 1/1975 | Moewe |
| 3,877,574 A | 4/1975 | Killick |
| 3,942,234 A | 3/1976 | Kepler |
| 3,946,873 A | 3/1976 | MacDonnell |
| 4,141,129 A | 2/1979 | Martini |
| 4,610,834 A | 9/1986 | Baron et al. |
| 4,615,440 A | 10/1986 | Downing |
| 4,719,684 A | 1/1988 | Mutter |
| 5,535,909 A | 7/1996 | Philip |
| 5,971,028 A | 10/1999 | Kurimoto et al. |
| 6,722,011 B1 * | 4/2004 | Bacon ................ B23P 19/084 29/222 |
| 6,779,660 B1 | 8/2004 | Calvert et al. |
| 7,690,505 B2 | 4/2010 | Pete et al. |
| 8,001,995 B2 | 8/2011 | Molloy |
| 8,616,555 B2 | 12/2013 | Sridhar et al. |
| 8,640,314 B2 | 2/2014 | Armstrong |
| 9,179,989 B2 | 11/2015 | Mullaly |
| 9,494,237 B2 | 11/2016 | Veiga et al. |
| 9,511,486 B2 | 12/2016 | Lammers et al. |
| 9,636,810 B2 | 5/2017 | Lammers et al. |
| 9,744,602 B2 * | 8/2017 | Chen ................ B23B 31/4006 |
| 2003/0084556 A1 | 5/2003 | Dunlop |
| 2008/0301924 A1 | 12/2008 | Jarrett |
| 2011/0277987 A1 | 11/2011 | Frazier |
| 2015/0014908 A1 | 1/2015 | Chen |

FOREIGN PATENT DOCUMENTS

| | | |
|---|---|---|
| CN | 202607576 U | 12/2012 |
| CN | 103991055 A | 8/2014 |
| CN | 204961281 U | 1/2016 |
| CN | 107598830 A | 1/2018 |
| CN | 107806440 A | 3/2018 |
| CN | 210161049 U | 3/2020 |
| CN | 210164624 U | 3/2020 |
| DE | 4100045 C1 | 7/1992 |
| DE | 102005001225 A1 | 7/2006 |
| EP | 0185753 B1 | 7/1986 |
| EP | 0927824 A2 | 7/1999 |
| EP | 0927825 B1 | 9/2004 |
| WO | 9303279 A1 | 2/1993 |
| WO | WO9816742 A1 | 4/1998 |
| WO | WO2017034996 A1 | 3/2017 |

OTHER PUBLICATIONS

First Chinese Office Action for CN Application No. 2019102386358, dated Sep. 17, 2020, pp. 12.
First Chinese Office Action for CN Application No. 2019102328757, dated Apr. 24, 2020, pp. 11.
Extended European Search Report for EP Application No. 19165913.5, dated Jun. 14, 2019, pp. 6.
Extended European Search Report for EP Application No. 19165912.7, dated Jun. 14, 2019, pp. 6.
First Taiwan Office Action for TW Application No. 108110689, dated Aug. 22, 2022, pp. 8.

* cited by examiner

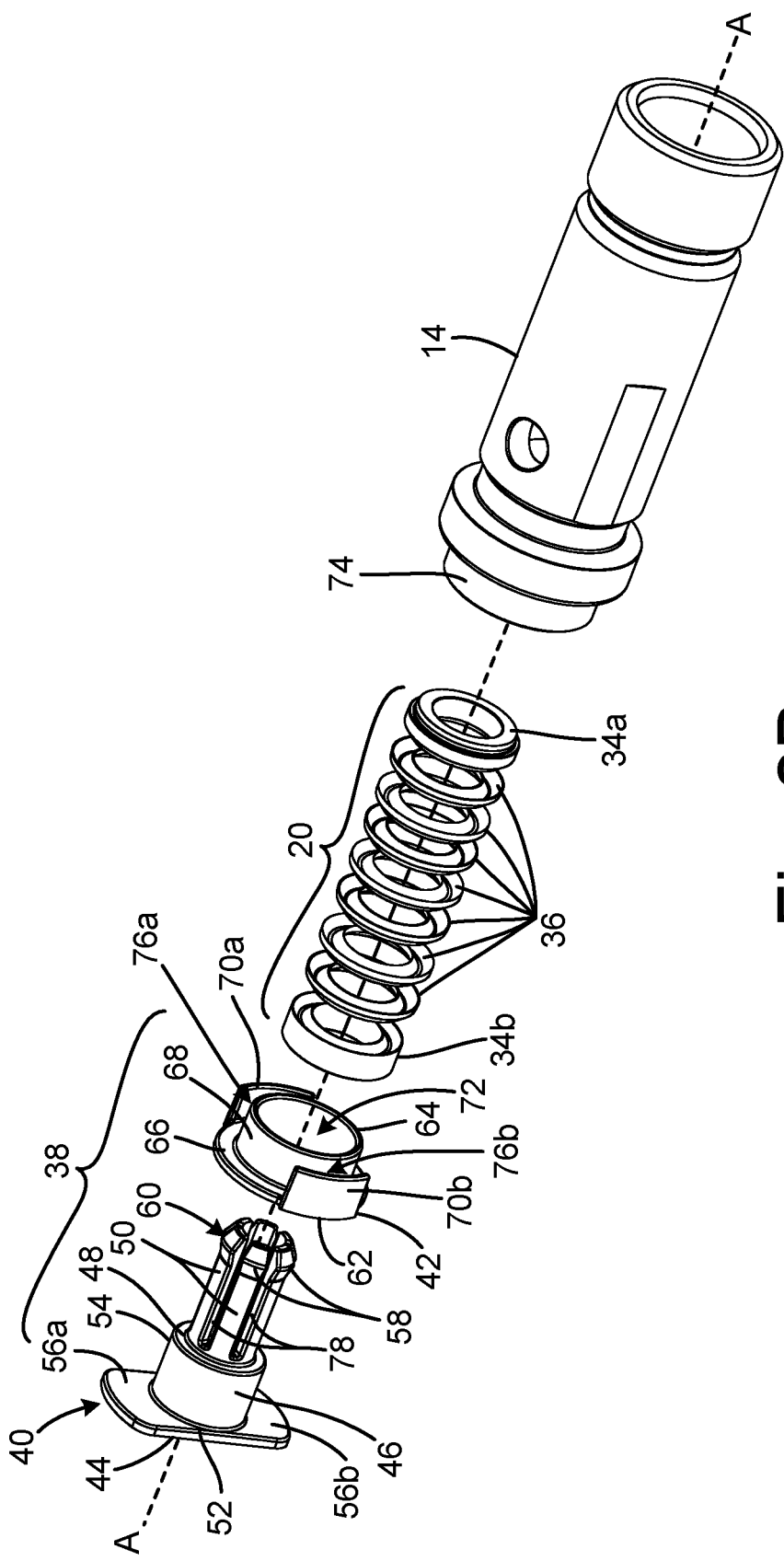

PACKING INSERTION TOOL FOR PAINT AND OTHER FLUID PUMPS

CROSS-REFERENCE TO RELATED APPLICATION(S)

This application claims the benefit of U.S. Provisional Application No. 62/648,996 filed Mar. 28, 2018 for "Packing Insertion Tool for Paint and Other Fluid Pumps" by J. Horning, W. Blenkush, and A. Legatt, the disclosure of which is hereby incorporated in its entirety.

BACKGROUND

The present disclosure relates to piston pumps, and in particular sealing elements within the pumps.

Piston pumps are used to pump fluids, typically at high pressures. The pump elements disclosed herein are particularly well suited for pumping paint, finishes, and other coatings which are typically abrasive, viscous, and/or otherwise difficult to pump. Packings are used to facilitate forming a dynamic seal in such difficult to handle fluid applications.

Packings are rings of sealing material. A packing can be formed from leather, rubber, polymer (e.g., ultra high molecular weight polyethylene or UHMWPE), and/or synthetic material. Packings commonly have complementary cross sections, such as having U or V cross section shapes, to mate and stack upon one another. Packings are typically arranged in a stack, such as six or more packing rings mounted atop one another. Packings of different types can be arranged in an alternating arrangement, such as leather-synthetic-leather-synthetic-leather-synthetic or other combinations.

Glands are rings (typically metal) which having complementally cross-sectional profiles, such as having U or V projecting and recessed cross-sectional shapes to mate and stack with the packings. A set of two glands are typically placed at both ends (top and bottom) of the stack of packings, bracketing the stack of packings. The glands can then be fixed to a component of the pump. The glands can retain the stack of packings within the pump.

Packings are used as dynamic sealing surfaces in which the packings either move with the piston or the piston moves relative to the packings. For example, a stack of packings can be mounted on a piston rod such that the packings move with the piston rod and slide along the inner surface of the bore of the cylinder. In other examples, a stack of packings can be mounted on the inside bore of a cylinder and are held static relative to the cylinder while the piston slides along the packings. In both examples, the packings seal between the cylinder and the piston to prevent leakage of fluid past the packings between the cylinder and the piston. When packings are used with double displacement pumps, two stacks of packings are commonly used. A first set of packings seal along the pump rod of the piston, commonly known as throat packings. A second set of packings seal along the piston head of the piston, commonly known as piston packings.

Packings can be difficult to handle and install, particularly when in a stacked arrangement. Within the pump, the packings are arranged coaxial and contacting one another, but can fall out of coaxial, contacting alignment when not secured in place. If one packing in a stack is not coaxially aligned with the rest of the packings in a stack, then the stack cannot be properly aligned within the cylinder and/or on the piston.

SUMMARY

According to one aspect of the disclosure, a packing holder for holding a packing stack on a longitudinal axis and depositing the packing stack in a pump cylinder includes a body; a handle disposed at a first end of the body; and a plurality of fingers extending axially from a second end of the body. The plurality of fingers are configured to flex to reduce a cross-sectional area defined by distal ends of the plurality of fingers in response to the packing stack passing over the distal ends of the plurality of fingers.

According to another aspect of the disclosure, a method of installing a packing stack within a cylinder of a pump including aligning the packing stack with a longitudinal axis of a bore of the cylinder, the packing stack mounted on a packing holder; shifting the packing holder in a first axial direction relative to the cylinder to insert the packing stack into the bore of the cylinder through a first end of the cylinder; and pulling the packing holder in a second axial direction, opposite the first axial direction, thereby pulling at least a portion of the packing holder through the packing stack to disengage the packing holder from the packing stack while leaving the packing stack disposed within the bore.

According to yet another aspect of the disclosure, a packing insertion kit for depositing a packing stack in a pump cylinder includes a packing stack, a packing holder, and a retainer disposed on the packing holder. The packing holder includes a body, a handle projecting radially from a first end of the body, and a support portion extending axially from a second end of the body, wherein the support portion is configured to extend through a central bore of the packing stack and is configured to support the packing stack. The retainer includes a retainer body having a first retainer end and a second retainer end, the retainer body defining a bore extending through the retainer body from the first retainer end to the second retainer end; and a brace projecting radially from the first retainer end. The retainer body is sized to receive the body of the packing holder within the bore. The support portion of the packing holder extends past the second retainer end.

BRIEF DESCRIPTION OF THE DRAWINGS

FIG. 2B is an exploded view of an insertion tool and pump cylinder.

DETAILED DESCRIPTION

Figure 1:
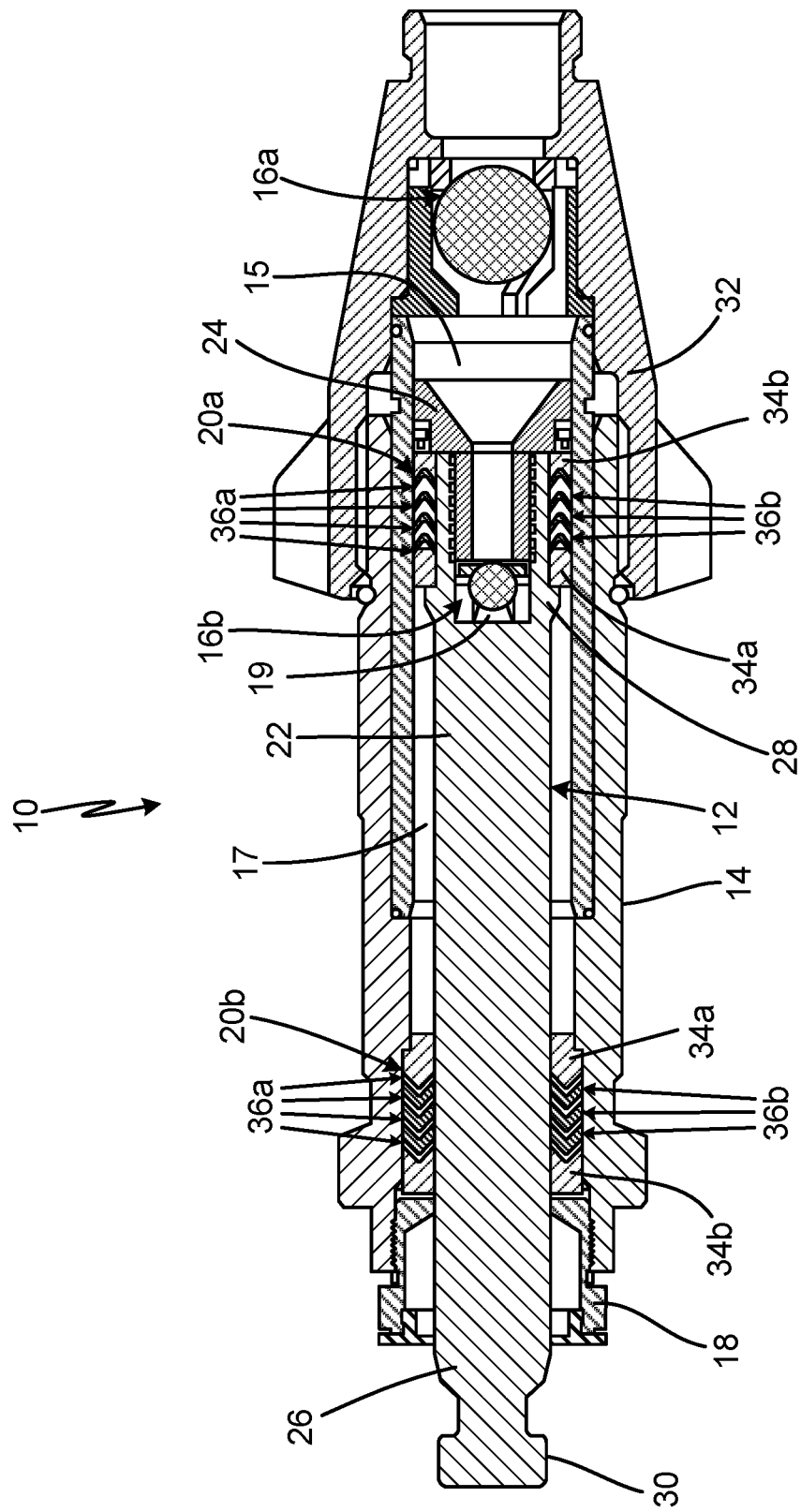
FIG. 1 is a cross-sectional view of a pump.

FIG. 1 is a cross-sectional view of pump 10. Pump 10 includes piston 12, cylinder 14, check valves 16a, 16b, retaining nut 18, packing stack 20a, and packing stack 20b. Piston 12 includes piston rod 22 and piston head 24. Piston rod 22 includes first end 26 and second end 28. First end 26 includes rod head 30. Intake housing 32 is disposed at a bottom of cylinder 14. Piston packing stack 20a includes glands 34*a*, 34*b* and packings 36*a*, 36*b*. Throat packing stack 20*b* also includes glands 34*a*, 34*b* and packings 36*a*, 36*b*.

Pump 10 reciprocates piston 12 within cylinder 14 to pump various fluids, examples of which include paint, water, oil, stains, finishes, aggregate, coatings, and solvents, amongst other options. Pump 10 can generate high fluid pumping pressures, such as 3,000-5,000 pounds per square inch or even higher. High fluid pumping pressure is useful for atomizing the fluid into a spray for applying the fluid to a surface.

Piston 12 is disposed within cylinder 14 and configured to reciprocate within cylinder 14. First end 26 extends out of cylinder 14 through throat packing stack 20*b*. Rod head 30 is disposed outside of cylinder 14 and is configured to connect to a drive system that drives reciprocation of piston 12. Piston head 24 is connected to second end 28 of piston rod 22. Piston head 24 can be connected to piston rod 22 in any desired manner, such as by interfaced threading or welding. In other examples, piston head 24 is integrally formed with piston rod 22, such that piston rod 22 and piston head 24 form a unitary assembly. Check valve 16*b* is disposed within piston rod 22. In the example shown, piston head 24 retains check valve 16*b* within piston rod 22.

Intake housing 32 is connected to the bottom of cylinder 14. In some examples, intake housing 32 is threadedly connected to cylinder 14. Check valve 16*a* is disposed within intake housing 32 and forms a one-way check valve to allow fluid to flow downstream into intake housing 32 while preventing the fluid from flowing upstream out of intake housing 32.

Retaining nut 18 is located at an opposite end of pump 10 from intake housing 32. Retaining nut 18 is secured to cylinder 14 and is configured to retain throat packing stack 20*b* within cylinder 14. Retaining nut 18 can be secured to cylinder 14 in any desired manner, such as by interfaced threading. Throat packing stack 20*b* is disposed within cylinder 14. Piston rod 22 extends through throat packing stack 20*b* and can reciprocate relative to packing stack 20*b*.

Throat packing stack 20*b* is configured to seal between piston rod 22 and the inner wall of cylinder 14. Piston packing stack 20*a* is disposed within cylinder 14 between piston 12 and cylinder 14. Piston packing stack 20*a* is configured to seal between piston 12 and the inner wall of cylinder 14. While piston packing stack 20*a* is shown as mounted on piston 12 to reciprocate with piston 12, it is understood that piston packing stack 20*a* can be mounted at a set location within cylinder 14 such that piston 12 reciprocates relative to piston packing stack 20*a*.

Piston 12 reciprocates within cylinder 14 to increase and decrease the volumes of both upstream chamber 15 and downstream chamber 17. Increasing and decreasing the volumes of upstream chamber 15 and downstream chamber 17 draws fluid into cylinder 14 and pumps the fluid downstream out of cylinder 14. During an upstroke, upstream chamber 15 expands creating suction and causing check valve 16*a* to open, while downstream chamber 17 shrinks, thereby causing check valve 16*b* to close and driving the fluid out of downstream chamber 17. During a downstroke, upstream chamber 15 shrinks, thereby causing check valve 16*a* to close, while downstream chamber 17 expands, opening check valve 16*b* and causing the fluid to flow from upstream chamber 15 to downstream chamber 17 through check valve 16*b* and piston rod 22. The fluid enters downstream chamber 17 through outlet 19 formed though piston rod 22. Pump 10 can be a double displacement pump such that piston 12 drives fluid downstream out of cylinder 14 during both the upstroke and the downstroke.

For each of throat packing stack 20*b* and piston packing stack 20*a*, packings 36*a*, 36*b* are arrayed between glands 34*a*, 34*b*. Packings 36*a*, 36*b* and glands 34*a*, 34*b* can be of any desired size and in any desired arrangement for suitably sealing around piston 12 during reciprocation of piston 12. Packings 36*a*, 36*b* are rings of sealing material and can be formed from leather, rubber, polymer (e.g., ultra high molecular weight polyethylene or UHMWPE), and/or synthetic material. Packings 36*a*, 36*b* commonly have complementary cross sections, such as having U or V cross section shapes, to mate and stack upon one another. Packings 36*a*, 36*b* are typically arranged in a stack, such as six or more packing rings mounted atop one another. Packings 36*a*, 36*b* of different types can be arranged in an alternating arrangement, such as leather-synthetic-leather-synthetic-leather-synthetic or other combinations. Glands 34*a*, 34*b* are typically formed from a metal. Each of throat packing stack 20*b* and piston packing stack 20*a* typically include one male gland, such as gland 34*a*, and one female gland, such as gland 34*b*, to complement the cross-sections of packings 36*a*, 36*b*. Packings 36*a*, 36*b* are sandwiched between glands 34*a*, 34*b*.

Figure 2A:
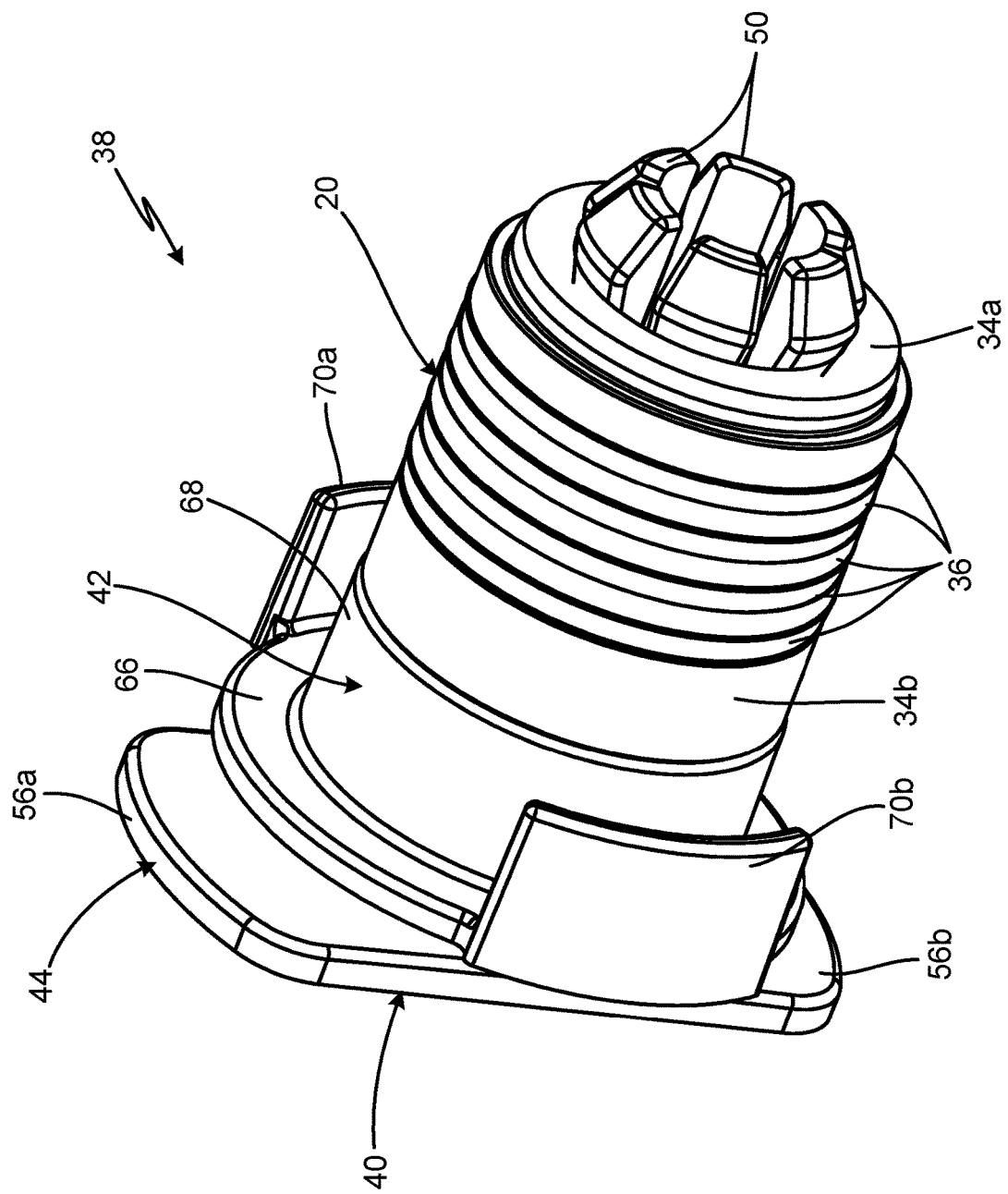
FIG. 2A is an isometric view of an insertion tool with a packing stack disposed thereon.

FIG. 2A is an isometric view of packing insertion tool 38 and packing stack 20. FIG. 2B is an exploded view of packing insertion tool 38, packing stack 20, and cylinder 14. Packing insertion tool 38 includes packing holder 40 and retainer 42. Packing holder 40 includes handle 44, body 46, shoulder 48, and fingers 50. Body 46 includes first end 52 and second end 54. Handle 44 includes tabs 56*a*, 56*b*. Each finger 50 includes ramped portion 58, and the ramped portions 58 define bulb 60. Retainer 42 includes first retainer end 62, second retainer end 64, brace 66, retainer body 68, retainer tabs 70*a*, 70*b*, and bore 72. Packing stack 20 includes glands 34*a*, 34*b* and packings 36. Cylinder 14 includes throat flange 74.

Handle 44 is disposed at first end 52 of body 46, which is also the first end of packing holder 40. Tabs 56*a*, 56*b* project radially from body 46 to form handle 44. While handle 44 is shown as including tabs 56*a*, 56*b*, it is understood that handle 44 can be configured in any suitable manner, such as an annular or arcuate flange extending radially from and disposed at first end 52. In other examples, handle 44 can be a portion of body 46 that projects out of cylinder 14 during installation. It is therefore understood that handle 44 can have a larger diameter than body 46, can have the same diameter as body 46, or can have a smaller diameter than body 46.

Body 46 extends between and can connect handle 44 and fingers 50. Fingers 50 extend from body 46 below shoulder 48 to second end 54 of packing holder 40. As shown, each finger 50 can be cantilevered from an end of body 46. Fingers 50 are arrayed circumferentially about longitudinal axis A-A. Fingers 50 can be splines that branch from body 46. Voids 78 are disposed between and defined by fingers 50. It is understood, that body 46 can have a minimal or no length, such that fingers 50 extend directly from handle 44. While packing holder 40 is described as including fingers 50, it is understood that packing holder 40 can include any desired support portion configured to extend through and support packing stack 20 on longitudinal axis A-A.

Each finger 50 includes ramped portion 58 at the distal end of each finger 50. Ramped portion 58 is formed by front and back angled or ramping surfaces formed on finger 50. The plurality of ramped portions 58 form bulb 60 disposed at second end 54 of packing holder 40. Bulb 60 defines an enlarged diameter portion of fingers 50. While fingers 50 are described as including bulb 60, it is understood that fingers 50 can include any desired retaining feature located at or proximate the distal end of fingers 50. In one example, a detent, such as a spring-loaded detent, can be located proximate the distal end of fingers 50 to retain packing stack 20 on fingers 50. In such an example the fingers 50 can be connected to adjacent fingers and/or can be formed as a unitary part without voids 78 and with the detent extending through a wall of the fingers 50.

Retainer 42 is configured to fit onto packing holder 40. Retainer body 68 extends between first retainer end 62 and second retainer end 64 and defines bore 72 through retainer 42. Retainer body 68 can be cylindrical and can extend from brace 66. It is understood, that the cylindrical retainer body 68 can be a solid cylinder or can be formed by multiple parts projecting from brace 66 and spaced relative each other. Brace 66 projects radially from first retainer end 62. Retainer tabs 70a, 70b project from an outer circumferential edge of brace 66 towards second retainer end 64. As such, gaps 76a, 76b are defined between retainer body 68 and retainer tabs 70a, 70b. In the example shown, retainer tabs 70a, 70b are curved. In some examples, retainer tabs 70a, 70b can have the same radius of curvature as the outer circumferential edge of brace 66.

As shown in FIG. 2A, retainer 42 is disposed on packing holder 40 to facilitate installation of packing stack 20 in cylinder 14. Body 46 is disposed within retainer body 68, and in some examples can extend out of second retainer end 64 of retainer body 68. Fingers 50 extend through retainer body 68 and project out of second retainer end 64. In the example shown, first retainer end 62 abuts the bottom sides of tabs 56a, 56b. Tabs 56a, 56b can be larger in the radial direction than brace 66, which allows a user to grasp a bottom side of tabs 56a, 56b during the process of installing packing stack 20 in cylinder 14.

During installation, retainer body 68 is configured to extend into a throat of cylinder 14. With packing stack 20 disposed on packing holder 40, retainer body 68 abuts gland 34b of packing stack 20. Brace 66 prevents retainer 42 from fully extending into cylinder 14 and is configured to engage the top side of throat flange 74 during installation of packing stack 20 in cylinder 14. It is understood that brace 66 can be of any desired configuration, such as tabs, an annular flange, multiple arcuate flanges, or any other suitable configuration for engaging the top side of throat flange 74. Retainer tabs 70a, 70b are configured to be disposed on the exterior of throat flange 74 during installation, such that throat flange 74 is received within gaps 76a, 76b between retainer tabs 70a, 70b and retainer body 68. Retainer tabs 70a, 70b engaging the exterior of throat flange 74 helps align packing stack 20 within cylinder 14. While packing insertion tool 38 is described as including retainer 42, it is understood that in some examples packing insertion tool 38 does not include retainer 42. In such an example, packing holder 40 is used to install packing stack 20 in cylinder 14 and the frictional interface between packing stack 20 and cylinder 14 retains packing stack 20 in cylinder 14 when packing holder 40 is removed from packing stack 20.

Fingers 50 retain the elements of packing stack 20 on packing holder 40 and are moveable to release the elements of packing stack 20 within the interior of cylinder 14. Fingers 50 form a reduced diameter portion between shoulder 48 and bulb 60, and packing stack 20 is retained on fingers 50 between shoulder 48 and bulb 60. Shoulder 48 and bulb 60 are wider than the inner diameter of the apertures through packings 36 and glands 34a, 34b, which prevents packing stack 20 from sliding off of packing holder 40 unless desired by the user. The ramped portion 58 of each finger 50 includes angled surfaces 59a, 59b (FIG. 3B) and apex 61 where angled surfaces 59a, 59b meet. The angled surfaces 59a, 59b cause fingers 50 to flex when rings, such as packings 36 and glands 34a, 34b are moved over bulb 60. With each finger 50 cantilevered from body 46, voids 78 facilitate flexing of each finger 50 radially inward to reduce the outer profile (e.g., diameter) of bulb 60 to allow fingers 50 (including the bulb 60) to be inserted through and withdrawn through the central aperture of packing stack 20.

Figure 3A:
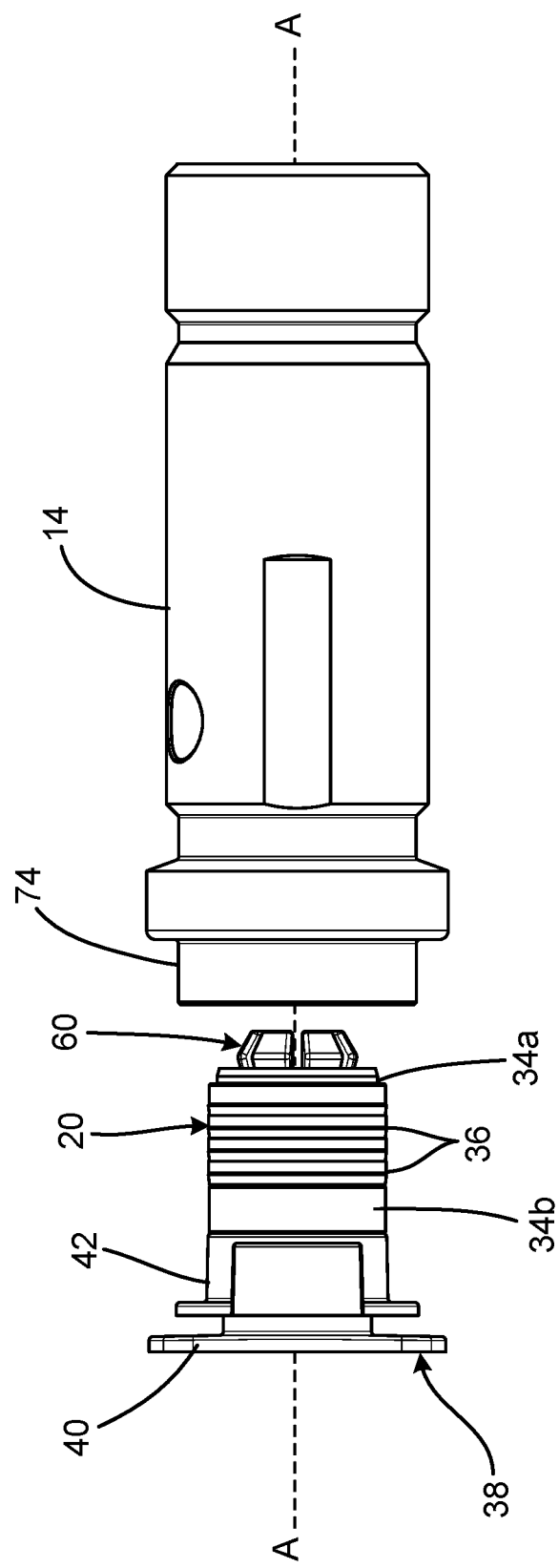
FIG. 3A is an elevation view of an insertion tool and pump cylinder.
Figure 3B:
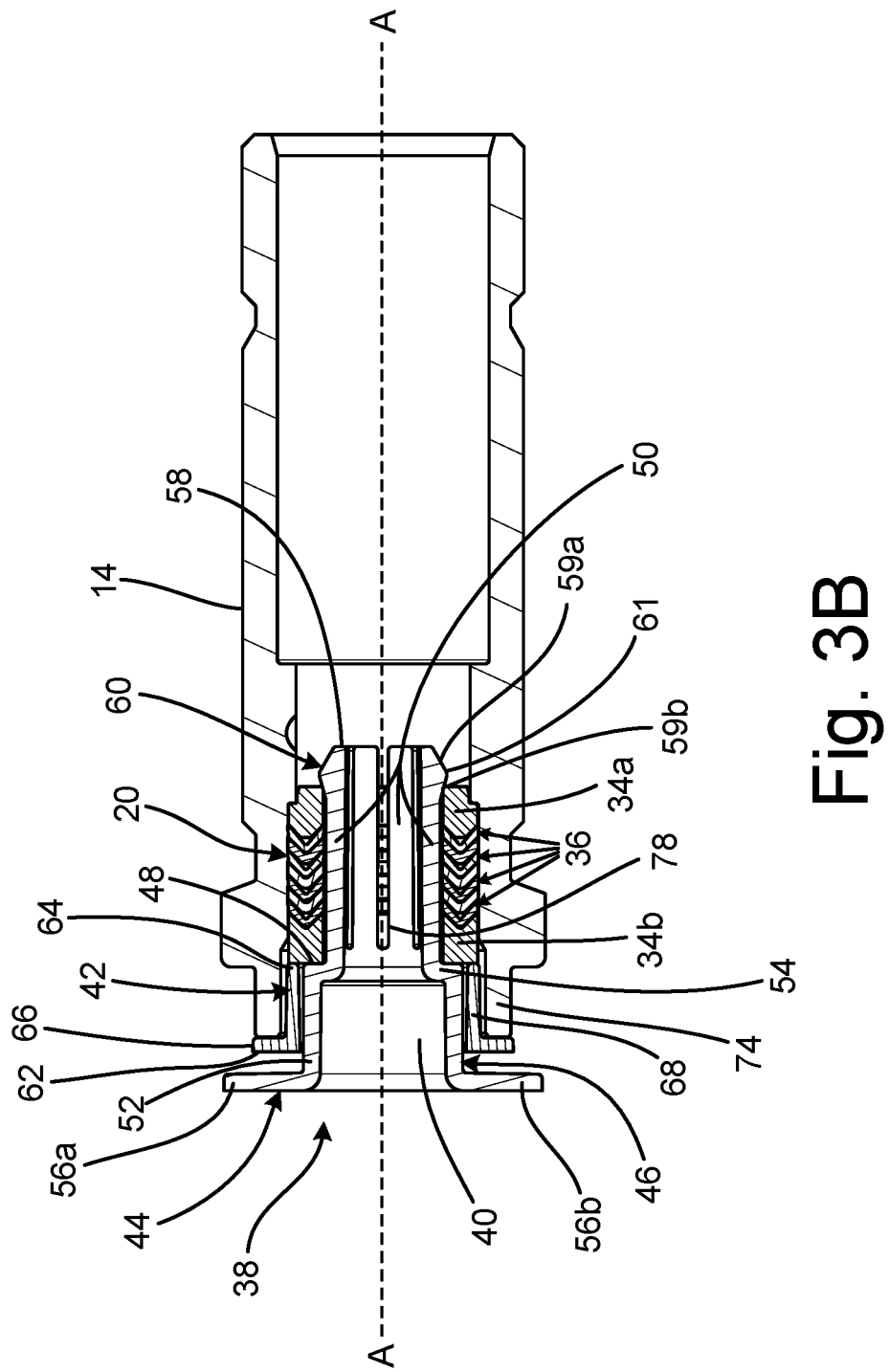
FIG. 3B is a cross-sectional view of an insertion tool and pump cylinder in a first installation stage.
Figure 3C:
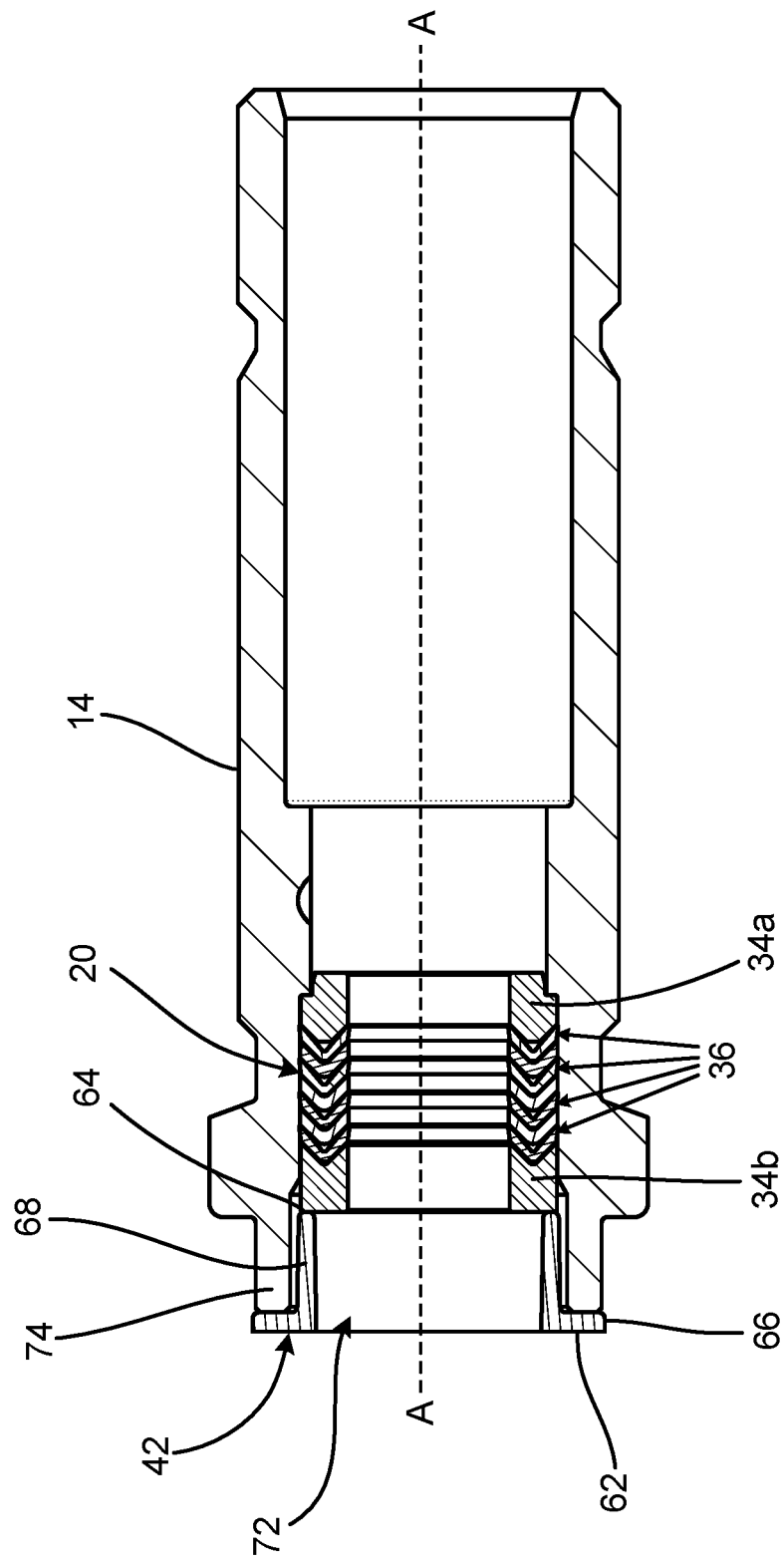
FIG. 3C is a cross-sectional view of an insertion tool and pump cylinder in a second installation stage.
Figure 3D:
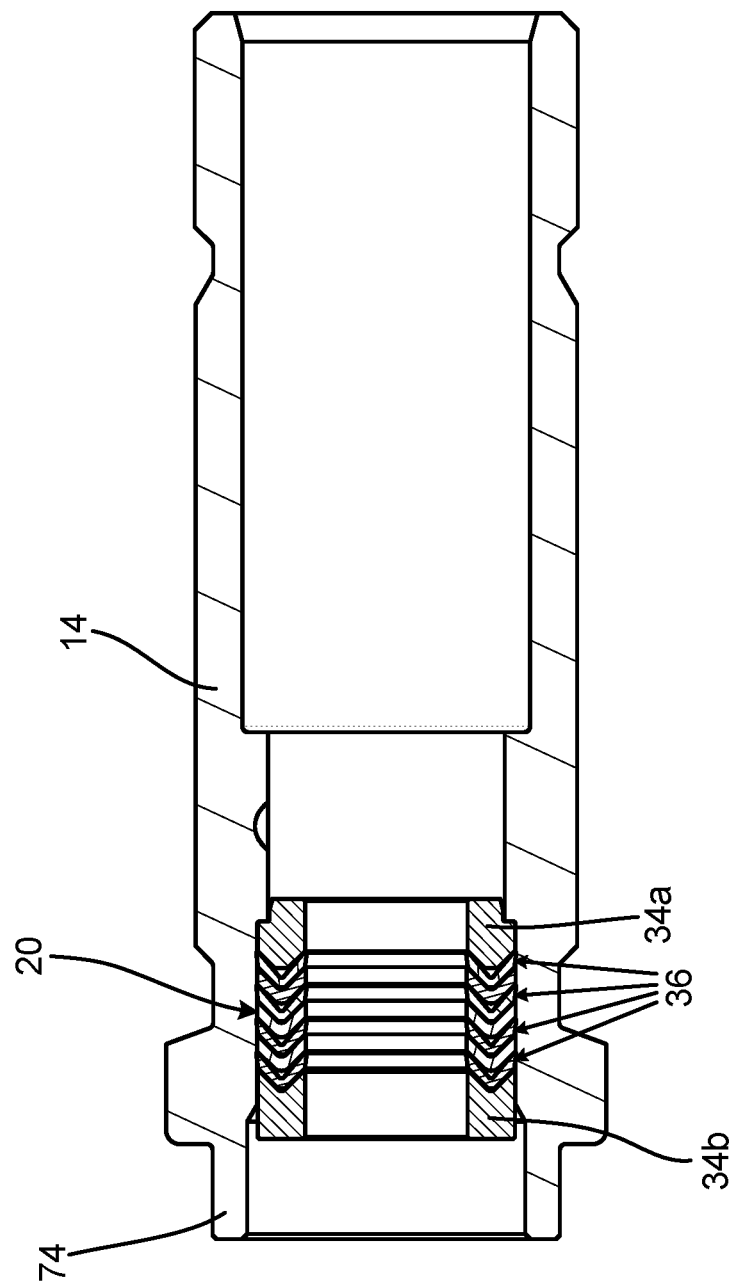
FIG. 3D is a cross-sectional view of a pump cylinder after packing installation.

FIG. 3A is an elevation view of packing insertion tool 38 and cylinder 14. FIG. 3B is a cross-sectional view of packing insertion tool 38 and cylinder 14 in a first installation stage. FIG. 3C is a cross-sectional view of packing insertion tool 38 and cylinder 14 in a second installation stage. FIG. 3D is a cross-sectional view of cylinder 14 after installation of packing stack 20. FIGS. 3A-3D will be discussed together. Packing insertion tool 38 includes packing holder 40 and retainer 42. Packing holder 40 includes handle 44, body 46, shoulder 48, and fingers 50. Handle 44 includes tabs 56a, 56b. Body 46 includes first end 52, second end 54. Each finger 50 includes ramped portion 58, and the ramped portions 58 define bulb 60. Each ramped portion 58 includes angled surfaces 59a, 59b and apex 61. First retainer end 62, second retainer end 64, brace 66, and retainer body 68 of retainer 42 are shown. Packing stack 20 includes glands 34a, 34b and packings 36. Cylinder 14 includes throat flange 74.

In FIG. 3A, packings 36 and glands 34a, 34b are disposed on packing insertion tool 38. As such, all elements of packing stack 20 are mounted on packing insertion tool 38. Specifically, all elements of packing stack 20 are captured on fingers 50 between retainer 42 and bulb 60. The elements of packing stack 20 are coaxially aligned on packing insertion tool 38 by packing insertion tool 38. The elements of packing stack 20 are kept in contact with adjacent elements of the packing stack 20 by packing insertion tool 38. More specifically, the male and female features of glands 34a, 34b and packings 36 engage each other in a complementary manner. The elements of packing stack 20 can be maintained in compression by the spring resilience of fingers 50 and bulb 60 pushing back on an end of packing stack 20 adjacent bulb 60, such as on gland 34a. The other end of packing stack 20 can in turn be pushed against retainer 42 (or handle 44 of packing holder 40 in examples where retainer 42 is not present), to retain the engagement and arrangement of the elements of packing stack 20. In this state, packing stack 20 can be mounted on packing insertion tool 38 in a factory and then packaged, shipped, stored, sold to end users, and used by the end user for servicing of pump 10 (FIG. 1) when needed, without the end user having to load the elements of packing stack 20 on packing insertion tool 38, or the user having to pick from loose glands 34a, 34b and packings 36 and assemble them in a stack and/or place them within the bore of cylinder 14.

Packing insertion tool 38, with packing stack 20 mounted thereon, can be aligned coaxially with the bore of cylinder 14 and then inserted into the bore of cylinder 14 to deposit packing stack 20 within the bore of cylinder 14. Packing insertion tool 38 is shifted axially along axis A-A from the position shown in FIG. 3A to the position shown in FIG. 3B.

In FIG. 3B, packing insertion tool 38 has been inserted into the rear opening of the bore of cylinder 14. The elements of packing insertion tool 38, except for handle 44 and brace 66 of retainer 42, are smaller than the inner diameter of the bore of cylinder 14. Brace 66 of retainer 42 engages throat flange 74 of cylinder 14 (or another component of pump 10) to set the depth of insertion of insertion tool 38, and thus the depth of insertion of packing stack 20 carried thereon, into the bore of cylinder 14. In examples not including retainer 42, a portion of packing holder 40, such as tabs 56a, 56b, engages throat flange 74 (or another component of pump 10) to set the depth of insertion of packing insertion tool 38, and thus of packing stack 20 carried thereon, into the bore of cylinder 14. Limiting the depth of insertion of packing insertion tool 38 into the bore of cylinder 14 positions packing stack 20 at the proper location within cylinder 14.

With packing stack disposed at the desired location within cylinder 14, packing insertion tool 38 can be removed from cylinder 14, leaving packing stack 20 at the desired position and in the proper alignment within cylinder 14. Packing holder 40 is pulled axially rearward along axis A-A away from cylinder 14, leaving all elements of packing stack 20 in place within the bore of cylinder 14. Angled surfaces 59a, 59b of ramped portions 58 forming bulb 60 forces fingers 50 to flex radially inward, decreasing the size of voids 78 and the cross-sectional profile of bulb 60, as bulb 60 and the rest of fingers 50 are pulled axially through the central aperture of packing stack 20. Frictional interference of packings 36 with the inner surface of the bore of cylinder 14 can keep the elements of packing stack 20 in place within the bore of cylinder 14 during withdrawal of packing holder 40.

Additionally or alternatively, retainer 42 can be utilized to retain the elements of packing stack 20 within cylinder 14. The user can hold retainer 42 against cylinder 14 (or another component of pump 10) while pulling rearward on handle 44 (or other portion of packing holder 40). For example, the user can brace the brace 66 against throat flange 74, such that retainer body 68 engages with and braces against the rear end of packing stack 20 to prevent rearward movement of packing stack 20 relative to cylinder 14 while packing holder 40 is removed from within cylinder 14. As such, retainer 42 maintains the elements of packing stack 20 in the desired position and orientation within cylinder 14 during removal of packing holder 40. It is understood, however, that in some examples packing insertion tool 38 does not include retainer 42 but can still pull axially out of packing stack 20, while leaving the elements of packing stack 20 disposed in the proper position within the bore of cylinder 14.

As shown in FIG. 3C, packing holder 40 has been withdrawn from the bore of cylinder 14 and from within bore 72 of retainer 42. As discussed above, retainer 42 can prevent movement of packing stack 20 during withdrawal of packing holder 40 from packing stack 20. After withdrawing packing holder 40 from cylinder 14, retainer 42 can then be axially withdrawn from cylinder 14 in the same direction that packing holder 40 was withdrawn.

With both packing holder 40 and retainer 42 removed, cylinder 14 is in the state shown in FIG. 3D. Packing stack 20, including glands 34a, 34b and packings 36, remains within the bore of cylinder 14 and in the desired position within the bore. With packing holder 40 and retainer 42 removed the remaining elements of pump 10 can be assembled. For example, retaining nut 18 (FIG. 1) can be threaded into the throat of cylinder 14 to secure packing stack 20 within cylinder 14 and piston 12 (FIG. 1) can be inserted through the aperture of packing stack 20.

Packing insertion tool 38 provides significant advantages. Packing holder 40 maintains the elements of packing stack 20 in a desired, coaxial order prior to installation. For example, packing stack 20 can be pre-installed on packing insertion tool 38 (e.g., in a box, sack, blister pack, clamshell, or other package) with packings 36 and glands 34a, 34b in the correct order at the factory. The packings 36 can also be prepared for installation at the factory prior to mounting on packing insertion tool 38, such as by soaking the packings in oil. The user, upon opening the package, does not need to order and assemble packings 36 and glands 34a, 34b. Also, the user does not need to individually place the elements of packing stack 20 on the piston 12. Instead, packing insertion tool 38 facilitates installation by allowing the user to slide the full packing stack 20 into cylinder 14 and then remove packing insertion tool 38 from packing stack 20 while leaving packing stack 20 at the desired position within cylinder 14. Packing holder 40 also ensures that packing stack 20 is disposed at the desired depth within cylinder 14. Fingers 50 retain packing stack 20 on packing holder 40, while fingers 50 are configured to flex to allow packing stack 20 to slide on and off of fingers 50 as desired by the user. Retainer 42 can assist installation by maintaining packing stack 20 in the desired position and arrangement in cylinder 14 as packing holder 40 is withdrawn.

Figure 4:
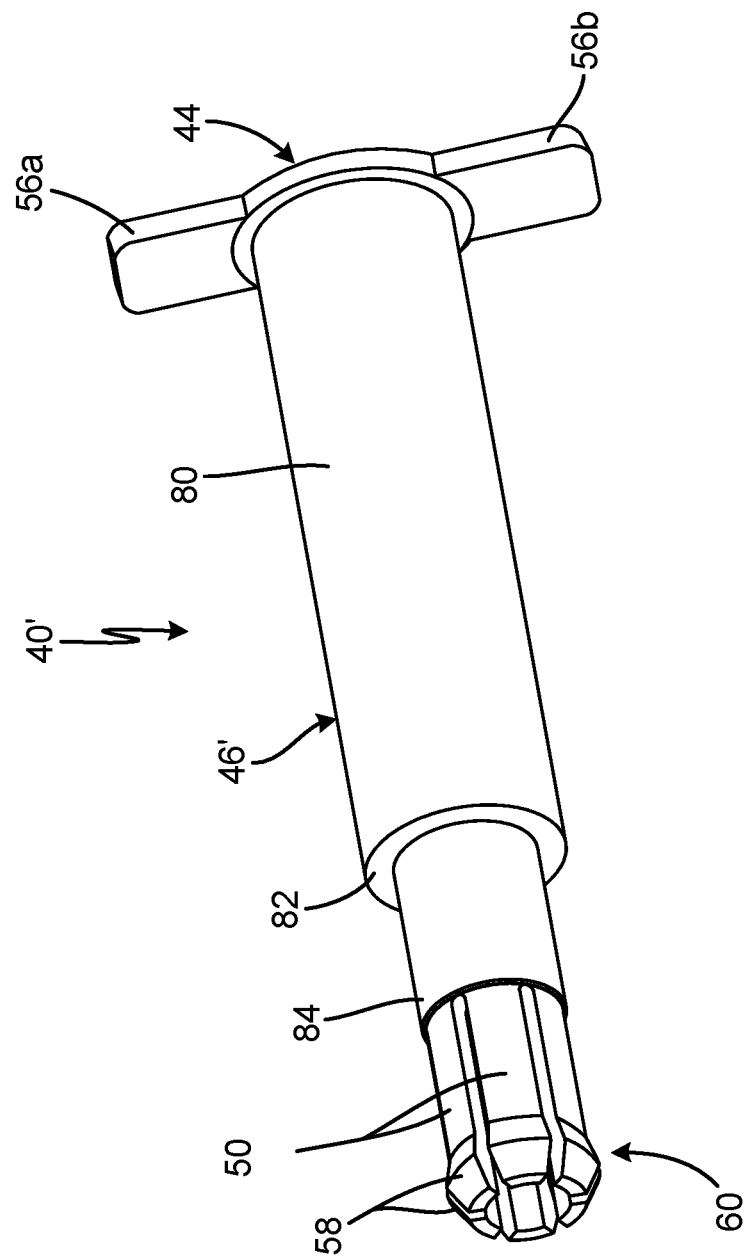
FIG. 4 is an isometric view of a packing holder.

FIG. 4 is an isometric view of packing holder 40'. Packing holder 40' includes handle 44, body 46', and fingers 50. Handle 44 includes tabs 56a, 56b. Each finger 50 includes ramped portion 58, and the ramped portions 58 define bulb 60. Body 46' is elongate and includes upper portion 80, intermediate shoulder 82, and lower portion 84.

Body 46' extends between and connects handle 44 and fingers 50. Tabs 56a, 56b extend laterally from body 46' to form handle 44. While handle 44 is shown as including tabs 56a, 56b, it is understood that handle 44 can be configured in any suitable manner, such as an annular or arcuate flange disposed at first end 52.

Fingers 50 extend from lower portion 84 of body 46'. Each finger 50 can be cantilevered from body 46'. Each finger 50 also includes ramped portion 58 disposed at the distal end of each finger 50. The ramped portions 58 form bulb 60 at the distal end of fingers 50. Voids 78 are disposed between fingers 50 to facilitate flexing of fingers 50 as a packing stack slides on and off of fingers 50.

Packing holder 40' is configured to hold two separate packing stacks for simultaneous installation within a cylinder, such as cylinder 14 (FIGS. 1-3D). For example, the separate packing stacks can be a throat packing stack and a piston packing stack. Packing holder 40' facilitates installation of both packing stacks when each packing stack 20 is maintained at a set position relative to cylinder 14, such that piston 12 (FIG. 1) reciprocates relative to each packing stack. In this case, body 46 is elongate to receive the two packing stacks. The separate packing stacks are located at different locations along packing holder 40 and do not contact one another. Packing holder 40 is configured to deposit the packing stacks at different locations within a bore of the cylinder 14. Upper portion 80 of body 46 has a larger diameter than lower portion 84 of body 46. As such, packing holder 40 can facilitate insertion of two packing stacks of differing diameters into cylinder 14. For example, the throat packing stack can be disposed on lower portion 84 and retained by fingers 50 while the piston packing stack can be disposed on upper portion 80.

Packing holder 40' can be inserted into the bore of cylinder 14 from an end opposite the throat flange 74 (FIGS. 2A-3D) of cylinder 14. Body 46' has sufficient length such that fingers 50 deposit the throat packing stack within the throat of cylinder 14, while the piston packing stack is disposed on upper portion 80 of body 46'. Upper portion 80 can be suitably dimensioned to deposit the piston packing stack at a desired location within cylinder 14. In some examples, a retainer, such as retainer 42, can be utilized with packing holder 40' to facilitate installation of the packing stacks within cylinder 14.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A packing insertion assembly comprising:
   a packing stack comprising a plurality of packing rings;
   a packing holder configured to hold the packing stack on a longitudinal axis and deposit the packing stack in a pump cylinder, the packing holder comprising:
      a body;
      a handle disposed at a first end of the body;
      a plurality of fingers extending axially from a second end of the body, wherein the plurality of fingers are configured to flex to reduce a cross-sectional area defined by distal ends of the plurality of fingers in response to the packing stack passing over the distal ends of the plurality of fingers; and
      a first ramped portion disposed at a first distal end of a first one of the plurality of fingers, wherein the first distal end is one of the distal ends;
   wherein the packing stack is mounted on the plurality of fingers between the handle and the first ramped portion.

2. The assembly of claim 1, wherein the first ramped portion includes a first angled surface extending from the first distal end to an apex of the first ramped portion, and a second angled surface extending from the apex towards the body, wherein the apex is a radially-outermost part of the first finger.

3. The assembly of claim 1, wherein each one of the plurality of fingers includes a ramped portion such that there are a plurality of ramped portions arrayed about the longitudinal axis.

4. The assembly of claim 3, wherein the plurality of ramped portions form a bulb.

5. The assembly of claim 4, wherein each one of the plurality of fingers is cantilevered from the body.

6. The assembly of claim 1, wherein the handle projects radially from the first end.

7. The assembly of claim 6, wherein the handle includes at least one tab projecting radially from the first end.

8. The assembly of claim 1, wherein the body includes an annular shoulder disposed at the second end.

9. The assembly of claim 1, wherein the packing stack is a first packing stack disposed on the plurality of fingers, and wherein a second packing stack is disposed on the body such that the second packing stack does not contact the first packing stack.

10. A packing insertion tool comprising:
    the assembly of claim 1; and
    a retainer configured to be disposed on the packing holder, the retainer comprising:
       a retainer body having a first retainer end, a second retainer end, and a bore extending through the retainer body; and
       a brace projecting from the retainer body;
    wherein the retainer body is sized to receive the body of the packing holder within the bore; and
    wherein the plurality of fingers project past the second retainer end.

11. The packing insertion tool of claim 10, wherein the retainer body is cylindrical and projects axially from the brace, the cylinder having the first retainer end and the second retainer end, wherein the bore extends from the first retainer end to the second retainer end.

12. A packing insertion tool comprising:
    a packing holder for holding a packing stack on a longitudinal axis and depositing the packing stack in a pump cylinder, the packing holder comprising:
       a body;
       a handle disposed at a first end of the body; and
       a plurality of fingers extending axially from a second end of the body, wherein the plurality of fingers are configured to flex to reduce a cross-sectional area defined by distal ends of the plurality of fingers in response to the packing stack passing over the distal ends of the plurality of fingers;
    a retainer configured to be disposed on the packing holder, the retainer comprising:
       a retainer body having a first retainer end, a second retainer end, and a bore extending through the retainer body; and
       a brace projecting from the retainer body;
       a plurality of retainer tabs projecting axially from an outer edge of the brace;
    wherein the retainer body is cylindrical and projects axially from the brace, the cylinder having the first retainer end and the second retainer end, wherein the bore extends from the first retainer end to the second retainer end;
    wherein the retainer body is sized to receive the body of the packing holder within the bore;
    wherein the plurality of fingers project past the second retainer end; and
    wherein gaps are formed between the plurality of retainer tabs and the retainer body.

13. The packing insertion tool of claim 12, wherein the plurality of retainer tabs extend from the brace parallel with the retainer body.

14. The packing insertion tool of claim 11, wherein the retainer body has a first radial width, the brace has a second radial width, and the first radial width is smaller than the second radial width.

15. A packing insertion tool comprising:
    a packing holder for holding a packing stack on a longitudinal axis and depositing the packing stack in a pump cylinder, the packing holder comprising:
       a body;
       a handle disposed at a first end of the body; and
       a plurality of fingers extending axially from a second end of the body, wherein the plurality of fingers are configured to flex to reduce a cross-sectional area defined by distal ends of the plurality of fingers in response to the packing stack passing over the distal ends of the plurality of fingers;
    a retainer configured to be disposed on the packing holder, the retainer comprising:
       a retainer body having a first retainer end, a second retainer end, and a bore extending through the retainer body; and
       a brace projecting from the retainer body;
    wherein the retainer body is cylindrical and projects axially from the brace, the cylinder having the first retainer end and the second retainer end, wherein the bore extends from the first retainer end to the second retainer end;

wherein the retainer body is sized to receive the body of the packing holder within the bore;

wherein the plurality of fingers project past the second retainer end;

wherein the handle projects a first radial distance from the first end of the body;

wherein the brace projects a second radial distance from the retainer body; and wherein the first radial distance is larger than the second radial distance.

16. The packing insertion tool of claim 10, wherein:

each one of the plurality of fingers includes a ramped portion such that there are a plurality of ramped portions arrayed about the longitudinal axis;

the second end of the body of the packing holder includes an annular shoulder;

the packing stack is disposed on the plurality of fingers between the annular shoulder and the plurality of ramped portions;

the plurality of ramped portions retain the packing stack on the plurality of fingers;

the packing stack projects radially beyond the annular shoulder; and the second retainer end abuts a portion of the packing stack projecting radially beyond the annular shoulder.

17. A method of installing the packing stack within the pump cylinder using the packing insertion tool of claim 10, the method comprising: inserting the packing stack mounted on the packing holder into a cylinder bore of the pump cylinder; and withdrawing the packing holder from the pump cylinder while leaving the packing stack disposed within the cylinder bore of the pump cylinder.

* * * * *